May 25, 1965     B. H. FIEDLER     3,184,904

CENTRIFUGAL DISK SEED HARVESTER

Filed Sept. 21, 1962

Inventor
Bruce H. Fiedler
By Ronald C. McGaughey
Attorney ns Patent Office 3,184,904
Patented May 25, 1965

3,184,904
CENTRIFUGAL DISK SEED HARVESTER
Bruce H. Fiedler, Milwaukee, Wis., assignor to Allis-Chalmers Manufacturing Company, Milwaukee, Wis.
Filed Sept. 21, 1962, Ser. No. 225,308
5 Claims. (Cl. 56—126)

The present invention relates generally to grain harvesting machines and more specifically to a machine for separating grain from its associated stalk by means of centrifugal action.

In the prior art, it is common practice to first cut the standing grain stalks and then separate out the grain by means of threshing. As is well known, separation by threshing involves beating the grain in order to cause physical separation of the head of the grain from the stalks and husks. The beating is usually accomplished by means of a threshing cylinder which rotates at high speed and in spaced relation to a stationary concave. In the operation of the cylinder and concave the grain stalk is passed between the peripheral surface of threshing cylinder and mating surface of the concave where a beating, scrubbing and rubbing action takes place in order to loosen the grain from the stalks and hulls.

The practice of the prior art is not entirely satisfactory because invariably the action of the threshing cylinder and concave on the stalks and grain spikes produces a great deal of chaff and straw which mixes with the grain. In order to make this type of separating procedure satisfactory, it is necessary to take the threshed grain, straw and chaff and run it through a highly complex system of straw walkers, sieves and screens in order to physically separate out the grain from the straw and chaff. In addition, fans are usually employed as an aid in separating the grain from the straw and chaff.

There are several drawbacks to this separating system. It is apparent that the cutting and threshing process produces far too much fine straw and chaff which gives rise to the need for complex, additional separating means, such as straw walkers, sieves, screens and blowers. Further, the spacing between the cylinder and concave is very critical and must be accurately set for each type of grain being threshed. If the setting is too close, the seeds are crushed or cracked. If the setting is too wide, improper threshing takes place. Humidity conditions also may require changes in the setting. All of these changes in setting require that the machine be out of operation. In addition, the concave and cylinder assembly is subject to rapid wear because of the abrasive action of the grain and must be frequently replaced.

There are also drawbacks to the use of fans and blowers to aid in the separation of the grain from the straw and chaff. First, the blowers are exceedingly difficult to adjust. If the grain happens to be somewhat damp, one degree of adjustment is necessary, and should the grain become somewhat drier, this opening or adjustment must be changed. If the blower is not accurately adjusted, a great deal of grain will be passed out of the machine along with the straw and chaff. When threshing out hybrid seeds to be used for planting, losses of this type can be very expensive as hybrid seeds are frequently valued at more than a dollar per pound. In addition to being difficult to set, the actual setting of these blowers requires the machine to be out of operation for the period of time during which the adjustment is made. Thus, if the operator finds he is losing too much seed along with the straw and chaff, he must stop the machine and take valuable time to readjust the blowers.

Another drawback of prior art separating mechanisms is that they are extremely expensive to fabricate and assemble. The openings in the sieves and screens must be very accurately controlled. In addition, the sieves are frequently vibrated and the degree and speed of vibration must be varied and adjusted for different grains and humidity conditions.

Accordingly, it is the object of my invention to provide an improved harvesting machine which will be avoid the shortcomings of the prior art, discussed hereinabove.

It is another object of my invention to provide a harvesting machine for separating the grain from the stalks which is of a highly simplified design and economical to fabricate and assemble.

It is a further object of my invention to provide a harvesting machine which efficiently separates grain from stalks in a simplified manner and which is not subject to wear and does not require frequent replacement of operating parts.

It is an additional object of my invention to provide a harvesting machine for separating grain from stalks which will not need periodic adjustment to provide proper separating action.

It is a further object of my invention to provide a grain harvesting machine which will harvest the grain without first cutting the grain stalk.

These and other objects and advantages are obtained by the present invention, various novel features of which will be apparent from the description herein and the accompanying drawing which discloses an embodiment of the invention and will be more particularly pointed out in the appended claims.

Referring to the drawings: FIG. 1 is a front view of the harvesting machine;

Figure 1:
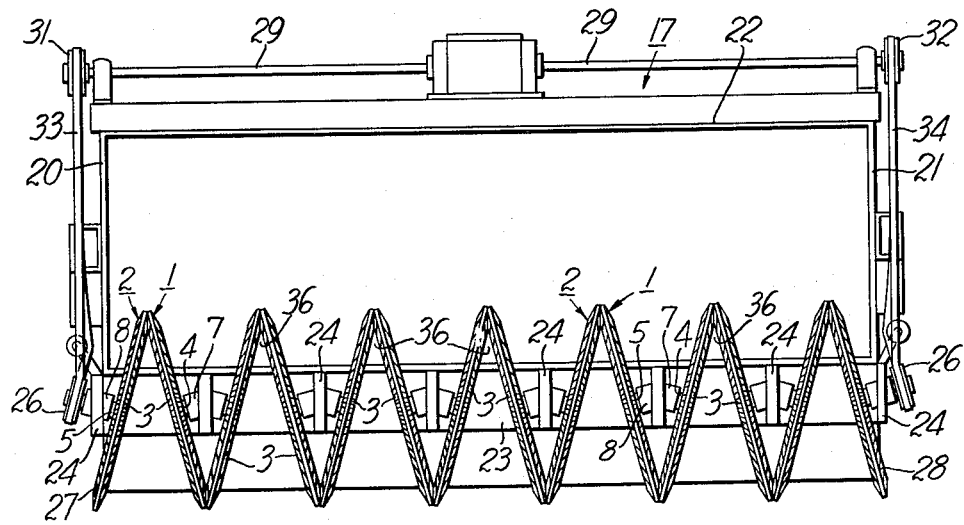
Figures 2, 3, 4:
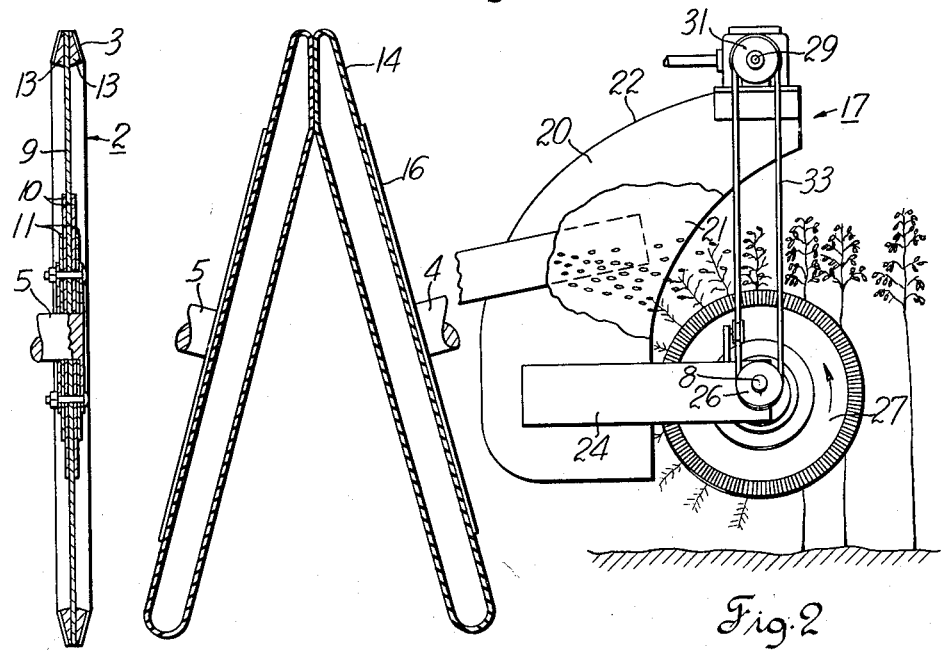
FIG. 2 is a side view of the harvesting machine shown in FIG. 1.
FIG. 3 is a sectional view of one of the separating members, shown in FIGS. 1 and 2.
FIG. 4 is a showing of a modified form of separating member.

Referring to FIG. 1, the harvesting machine includes a plurality of pairs of disks 1 and 2, each having a resilient stalk engaging surface 3. The resilient stalk engaging surface 3 is mounted on the outer periphery of the side wall of each disk. Disk 1 is fixedly mounted upon a shaft 4 and the disk 2 is fixedly mounted upon a shaft 5. Each of the shafts 4, 5 are rotatably mounted in suitable bearing structures 7 and 8 carried by a header assembly which will be described hereinafter. The separating disks 1 and 2 may be constructed in various ways and two embodiments of disks are shown in FIGS. 3 and 4. Referring to FIG. 3, the disks 1 and 2 may utilize a laminated construction comprising a series of flexible members 9, 10 and 11, such as stainless steel. The stalk engaging surfaces are provided by a resilient corrugated material 13, such as rubber, which is secured to the disks in any suitable manner as by vulcanizing. If desired, the disks may comprise a resilient air filled tube 14 secured to a backing member 16 as appears in FIG. 4.

As best appears from FIG. 1, the radial plane of each disk is inclined relative to the other so that they are in diverging relationship, to define an included angle between the disks 1 and 2 which is acute. The apex of the acute angle formed by the coverging disks 1 and 2 is disposed above the axis of rotation of the disks so that the adjacent pairs of disks will define a forwardly opening grain stalk entry passage. The spacing between the disks 1 and 2 is such that the stalk engaging surfaces 3 are presented in face to face abutting relation to each other. In both embodiments shown, the resilient stalk engaging surfaces are compressively engaged. With this arrangement, rotational driving power applied to one disk will, in turn, be transmitted to the other disk 1 so that the disks will rotate at equal speeds. It would be possible, however, to place the stalk engaging surfaces in facing proximate relation, that is, slightly spaced from each other so that the driving force for the disk number 1 would not be transmitted by the compressive engagement with disk number 3. With an embodiment of this type, it would be necessary to employ a separate rotational driving force to each of the disks. With this type of construction the spacing between the disks 1 and 2 would be such that the stalks would be engaged by both of the disks as they pass therebetween.

The individual pairs of disks 1 and 2 are combined into a header assembly 17 which will now be described. FIG. 1 shows the plurality of pairs of separating members 1 and 2 joined into a header assembly. The header assembly 17 comprises a pair of spaced side members 20, 21 joined by a grain receiving hood 22. The lower portion of each of the side members 20, 21 mounts a main cross support member 23. The support member 23 is provided with a plurality of forwardly projecting mounting arms 24. The arms 24 support the bearings 7 and 8 for rotatably mounting shafts 4 and 5 which, as discussed hereinabove, carry the separating disks 1 and 2.

The assembly of separating members 1 and 2 is so arranged that the back of each of the disks 1 and 2 is in compressive driving engagement with the back of an adjacent disk. A V-belt sheave 26 is mounted in driving relation with each of the end disks 27 and 28 of the assembly. Driving power for rotating the disks is supplied by any conventional power source, such as the power take-off of a tractor, not shown. Driving power is transmitted to and through a cross shaft mounted on the upper portion of the header assembly. V-belt sheaves 31, 32 are secured at opposite ends of cross shaft 29. The sheaves 31, 32 are aligned with the sheaves 26 carried by the end disks 27, 28 of the header assembly 17 and V-belts 33, 34 are trained about the aligned sheaves.

In operation, rotation of shaft 29 is transmitted through V-belts 33, 34 to rotate the end disks 27, 28 counterclockwise, as shown in FIG. 2. As all of the disks 1 and 2 are in compressive engagement with adjacent disks, the rotation is thereby transmitted through the entire header assembly. As mentioned hereinbefore, the stalk engaging surfaces may be formed of a resilient corrugated material. If desired, both sides of each disk may be of a corrugated material. When this is done, a more positive driving action is achieved.

To harvest, the header assembly is mounted on any suitable vehicle (not shown) and advanced into standing grain in conventional manner. As the stalks reach the nip 36 between abutting disks, they are gripped by the stalk engaging surfaces 3. This gripping subjects the stalk to high velocity acceleration. High speed movies of the harvesting action show that the inertia in the grain spike causes it to hold back for an instant during the acceleration of the stalk. The grain spike is then subjected to a quick jerk which separates out the grain. The separating action is aided by the centrifugal force to which the grain spikes are subsequently subjected as they travel around the periphery of the disks. The forces which separate the grain from the grain spikes impart rearward movement to the separated grain. Thus the grain is carried into the hood 22. The grain collects on the bottom of the hood and can be removed to a storage bin by any conventional means, such as a grain auger, not shown. Any stalks which are severed will pass about the periphery of the disks 1 and 2 and be dropped to the ground.

It is to be noted that it is not necessary to cut the grain prior to harvesting. In actual practice it has been found that many of the grain stalks are not severed from the ground by the action of the separating disks 1 and 2. If desired, it would be possible to mount conventional grain pickup fingers in front of the disks to aid in raising any fallen grain stalks.

In actual practice it has been found that satisfactory results were obtained by using disks approximately ten inches in diameter. While these disks may be rotated at various high speeds, satisfactory operation was obtained when they were rotated in the range of 1000 to 1500 r.p.m.

It is to be understood that it is not desired to limit the invention to the particular features and details described hereinabove, and that the invention is to be considered as including such other forms and modifications as are fairly embraced by the scope of the appended claims.

Having now particularly described and ascertained the nature of the invention and the manner in which it is to be performed, I declare that what I claim is:

1. A machine for separating grain kernels from stalks without contacting said kernels comprising a pair of disks each having a side wall, a resilient stalk engaging surface positioned on the outer periphery of said side wall, means for rotatably mounting said disks so that the radial planes of said disks are inclined relative to each other to define an acute included angle between them and present portions of said side wall stalk engaging surfaces in face to face abutting relation to each other, the apex of said acute angle being disposed above the axis of rotation of said disks so that adjacent pairs of disks will define a forwardly opening grain stalk entry passage, and means for rotating said disks at high speeds, whereby said stalks upon being gripped between said stalk engaging surfaces are initially subjected to high velocity acceleration so that the force of inertia in the grain spikes and the subsequent centrifugal force causes separation of the grain kernels.

2. A machine according to claim 1 wherein said disks comprise a plurality of flexible laminated disks secured together.

3. A machine for separating grain kernels from stalks without contacting said kernels comprising a pair of circular disks each having a side wall, a resilient tubular element mounted on the outer periphery of each side wall, each of said tubular elements presenting a stalk engaging surface, means for rotatably mounting said disks in diverging relationship to present portions of said stalk engaging surfaces in face to face compressive relation to each other, said diverging disks having an apex which is disposed above the axis of rotation of said disks so that adjacent pairs of disks will define a forwardly opening grain stalk entry passage, and means for rotating said disks at high speed, whereby said stalks upon being gripped between said stalk engaging surfaces are subjected to high velocity acceleration so that the force of inertia in the grain spikes and the subsequent centrifugal force causes separation of the grain kernels.

4. A machine for separating grain kernels from stalks without contacting said kernels comprising a pair of circular disks each having a side wall, a resilient corrugated stalk engaging surface mounted on the outer periphery of each side wall, means for rotatably mounting said disks in diverging relationship to present portions of said stalk engaging surfaces in face to face compressive relation to each other, said diverging disks having an apex which is disposed above the axis of rotation of said disks so that adjacent pairs of disks will define a forwardly opening grain stalk entry passage and means for rotating said disks at high speed, whereby said stalks upon being gripped between said stalk engaging surfaces are subjected to high velocity acceleration so that the force of inertia in the grain spikes and the subsequent centrifugal force causes separation of the grain kernels.

5. A harvesting machine for separating grain kernels from stalks of grain without contacting said kernels and without first cutting said stalks comprising a plurality of pairs of separating members each having a side wall and a stalk engaging surface located on the outer periphery of said side wall, means for rotatably mounting said pairs of members in converging relation to present portions of said stalk engaging surfaces in facing compressive relation to each other, said converging separating members presenting an apex disposed above the axis of rotation of said disks so that adjacent pairs of disks will define a forwardly opening grain stalk entry passage, means for rotating said disks at high speed, and means for advancing said pairs of disks into engagement with the stalks of standing grain, whereby said stalks upon being gripped between said stalk engaging surfaces are initially subjected to high velocity acceleration so that the force of inertia in the grain spikes and the subsequent centrifugal force causes separation of the grain kernels.

References Cited by the Examiner

UNITED STATES PATENTS

| | | | |
|---|---|---|---|
| 156,744 | 11/74 | Swaney | 171—56 |
| 1,042,704 | 10/12 | Marshel | 171—58 X |
| 1,182,149 | 5/16 | Douglass | 171—58 X |
| 2,495,417 | 1/50 | McConnel et al. | 56—129 |
| 2,656,667 | 10/53 | Smith et al. | 56—126 |

T. GRAHAM CRAVER, *Primary Examiner.*

ARNOLD RUEGG, ANTONIO F. GUIDA, *Examiners.*